(12) United States Patent
Allmen et al.

(10) Patent No.: US 12,468,064 B2
(45) Date of Patent: Nov. 11, 2025

(54) LIGHT GRID WITH DISTANCE MEASUREMENT

(71) Applicant: CEDES AG, Landquart (CH)

(72) Inventors: Andri von Allmen, Landquart (CH); Nannan Zhang, Changshu (CN)

(73) Assignee: CEDES AG, Landquart (CH)

( * ) Notice: Subject to any disclaimer, the term of this patent is extended or adjusted under 35 U.S.C. 154(b) by 0 days.

(21) Appl. No.: 18/993,152

(22) PCT Filed: Jul. 14, 2023

(86) PCT No.: PCT/EP2023/069696
§ 371 (c)(1),
(2) Date: Jan. 10, 2025

(87) PCT Pub. No.: WO2024/013386
PCT Pub. Date: Jan. 18, 2024

(65) Prior Publication Data
US 2025/0264631 A1    Aug. 21, 2025

(30) Foreign Application Priority Data
Jul. 14, 2022  (EP) ..................................... 22185045

(51) Int. Cl.
*G01V 8/20*    (2006.01)
(52) U.S. Cl.
CPC ...................... *G01V 8/20* (2013.01)
(58) Field of Classification Search
None
See application file for complete search history.

(56) References Cited

U.S. PATENT DOCUMENTS

| 4,266,124 A | 5/1981 | Weber et al. |
| 2005/0133702 A1 | 6/2005 | Meyer |

(Continued)

FOREIGN PATENT DOCUMENTS

| CN | 111273371 A | 6/2020 |
| CN | 111773371 | * 6/2020 |
| DE | 102012109985 A1 | 5/2014 |

OTHER PUBLICATIONS

International Preliminary Report on Patentability for International Application No. PCT/EP2023/069696, dated Sep. 30, 2024, 13 Pages.

(Continued)

*Primary Examiner* — Luke D Ratcliffe
(74) *Attorney, Agent, or Firm* — Christopher J. Volkmann; KELLY, HOLT & CHRISTENSON PLLC

(57) ABSTRACT

A light grid for determining the distance between transmitter and receiver strips, includes a transmitter strip with one or more transmitter elements which emit radiation having a specific intensity, a receiver strip with one or more receiver elements which receive the radiation from an assigned transmitter element, and a control device for controlling the transmitter elements and/or the receiver elements and for evaluating the receiver elements. At least one of the transmitter elements and/or at least one of the receiver elements are configured as qualified transmitter and receiver elements. The control device is configured to control different combinations of intensities and amplification factors of the qualified transmitter and/or receiver elements and to ascertain a distance value as a function of the sum of the resulting intensity values of the controlled combinations.

16 Claims, 3 Drawing Sheets

(56) References Cited

U.S. PATENT DOCUMENTS

| | | |
|---|---|---|
| 2007/0176777 A1* | 8/2007 | Reime ..................... G01V 8/20 |
| | | 340/545.3 |
| 2011/0204211 A1 | 8/2011 | Klingelhofer |
| 2011/0206366 A1 | 8/2011 | Klingelhoefer |
| 2016/0178794 A1 | 6/2016 | Rollins |
| 2019/0264487 A1* | 8/2019 | Zanolari .................. E06B 9/88 |

OTHER PUBLICATIONS

International Preliminary Report on Patentability for International Application No. PCT/EP2023/069697, dated Sep. 30, 2024, 29 Pages.
International Search Report and Written Opinion for International Application No. PCT/EP2023/069697, dated Oct. 10, 2023, 14 Pages.
International Search Report and Written Opinion for PCT Application No. PCT/EP2023/069696, Dated Oct. 10, 2023, 14 pages including English Translation.
European Search Report for German Patent Application No. 22185045. 6, Dated Dec. 7, 2022, 9 pages.

\* cited by examiner

LIGHT GRID WITH DISTANCE MEASUREMENT

CROSS-REFERENCE TO RELATED APPLICATIONS

This Application is a Section 371 National Stage Application of International Application No. PCT/EP2023/069696, filed Jul. 14, 2023, and published as WO 2024/013386A1 on Jan. 18, 2024, and claims priority to European Application No. 22185045.6, filed Jul. 14, 2022; the contents of each application are hereby incorporated by reference in their entirety.

BRIEF DESCRIPTION OF THE DRAWINGS

FIG. 2b illustrates a half-open double sliding door as in FIG. 2a.

FIG. 2 illustrates a closed double sliding door as in FIG. 2b.

DETAILED DESCRIPTION

Figure 1:
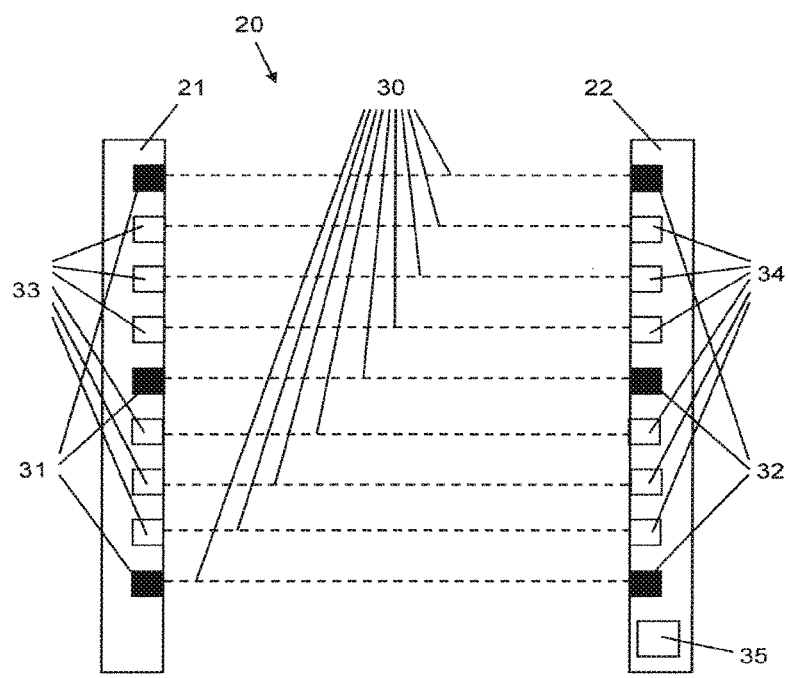
FIG. 1 illustrates a light grid, in one example.

The present disclosure relates to a light grid for object detection.

Light grids which comprise a transmitter strip and a receiver strip and form, between these two, a grid of light beams for object detection are known from the prior art. In particular, one or both strips of the light grid can be attached to the sliding door or the sliding doors of an elevator cabin in order to detect an object passing through the open door range.

CN 111 273 371 A discloses a light curtain in the case of which it is possible for transmitters and receivers to be actuated by a control unit in each case such that the transmitters emit at different intensities and the receivers provide different amplifications. In addition, the number of scanned time segments during the reception can be adjusted. This makes it possible to improve the installation of the light curtain, specifically at greater distances, in order to reduce or eliminate mounting impreciseness and inaccuracies caused by ambient light.

It is an object of the present disclosure to provide a light grid which enables a more differentiated monitoring which is less costly.

Proceeding from a light grid of the type mentioned in the introductory part, this object is achieved by a light grid as claimed in claim 1. Advantageous refinements are specified in the further, dependent claims.

The light grid according to one example is a light grid for determining the distance between transmitter and receiver strips, comprising a transmitter strip having one or more transmitter elements which emit radiation of a specific intensity, comprising a receiver strip having one or more receiver elements which receive the radiation from an assigned transmitter element, and comprising a control device for controlling the transmitter elements and/or the receiver elements and for evaluating the receiver elements, wherein in each case the transmitter element and receiver element or in each case at least one of the transmitter elements and/or at least one of the receiver elements are designed as qualified transmitter and receiver elements, wherein the qualified transmitter element or the qualified transmitter elements is/are configured to emit different intensity levels and/or the qualified receiver element or the qualified receiver elements is/are configured to apply different amplification factors and to output an intensity value for the received and amplified radiation, and the control device is configured to control different combinations of intensity levels and amplification factors of the qualified transmitter and/or receiver elements and to ascertain a distance value as a function of the sum of the resulting intensity values of the controlled combinations.

This can offer the advantage that the distance between the transmitter and receiver strips can be ascertained. At the same time, however, dynamic processes can be tracked and analysed very well. The grid, in turn, does not sacrifice any safety requirements in the process. In addition, it has surprisingly been found that the light grid according to one example allows for a very precise distance measurement.

The transmitter elements are generally arranged along a transmitter strip, while the receiver elements are accordingly generally arranged in the receiver strip. Both strips delimit the space to be monitored for example laterally.

A distance measurement is carried out in principle with the aid of the qualified transmitter elements. The way in which the light grid works is that a qualified transmitter element can emit radiation at at least two different intensity levels. It is also conceivable that different intensity levels are used in the emission from one qualified transmitter element to another.

Analogously, a qualified receiver element can also apply different amplification factors with which the intensity, or the intensity of the signal originating from the radiation detection, is amplified. Furthermore, the amplification factor can in principle differ from one qualified receiver element to another.

A combination can mean both a variation of the intensity level and also of the amplification factor.

The resulting intensity values are summed. This sum of intensity values can represent in particular a bijective mapping between intensity (here, the sum of the intensities) and the distance value, with the result that the resulting sum can be uniquely assigned a distance value.

However, in an advantageous development, each qualified receiver element is assigned to a specific qualified transmitter element, with the result that even for example if different transmitter elements map at different intensity levels, the control device still knows in advance, due to the unique assignment, in which intensity range the intensities of the qualified receiver elements should be expected. The evaluation can thus be simplified.

The intensity levels can represent discrete intensity values. Likewise, the amplification factors can be discrete amplification values. The evaluation can also be simplified due to this measure.

The combinations can in principle represent different intensity levels and amplification factors for different transmitter elements in different sequences. However, the sums of the intensity values can be selected such that a unique assignment of a distance value is possible. The distance value can accordingly lie in the measurement range to be checked.

Each combination can in one exemplary embodiment be used to capture a, possibly even very small, measurement range. The intensity values, however, preferably already allow a unique assignment of a distance value in this range.

All combinations together, that is to say their respective measurement ranges together, can map in particular a contiguous measurement range without gaps. As a result of this, an assignment of intensity to sum and thus to the distance value can be effected without gaps over this contiguous measurement range.

In one embodiment, the resulting intensity of a receiver element can transition into saturation at smaller distances than in the measurement range, and become zero if the distances are greater than the actual measurement range. In this variant, outside the measurement range lie constant values which differ from one another, however, depending on whether they lie in the range that is greater or smaller than the measurement range, with the result that when a sum of the intensities is formed, only the actual measurement range can also make a contribution to the unique assignment between intensity and distance.

The light grid, in particular the transmitter and receiver strips, preferably still have at least one or more further transmitter and receiver elements which are each in the form of simple transmitter elements and simple receiver elements and which are each designed as a light barrier and which preferably do not contribute to the combinations and/or from which the distance value is not ascertained, and/or which are used for object detection, and/or whose simple transmitter elements emit at least one intensity level like the qualified transmitter elements and whose receiver elements have at least one amplification factor like the qualified receiver elements.

This can offer the advantage that the light grid can be used for object detection. This can have the advantage that not all transmitter and receiver elements need to be qualified, as a result of which the complexity of the light grid decreases and costs can be saved. Such an exemplary embodiment also, however, makes it possible to achieve a compromise between exact object detection and a cost advantage, which is the result of the fact that not all transmitter or receiver elements must be equipped with the same functions, but individual elements can also be designed more cost-effectively with fewer functions.

According to one example, the control device is configured to control the combinations successively in a sequence and in particular to periodically repeat the sequence and in particular to ascertain the sum of the controlled combinations of a sequence and to ascertain in particular for each sequence a distance value. The control device is preferably configured to control all different combinations of intensity levels and amplification factors of the qualified transmitter and/or receiver elements, but in particular without using the highest intensity level of the qualified transmitter elements for the combinations, and/or to use those intensity levels and amplification factors of the qualified transmitter and receiver elements for object detection which correspond to the intensity levels and amplification factors of simple (non-qualified) transmitter and/or receiver elements.

This can offer the advantages that a time period is established after which the distance value is present, that the distance value is ascertained repeatedly quasi-continuously, that the distance value is present dynamically in temporal succession. This can have the advantages that the calculation of the distance value can be effected easily and quickly. This can have the advantage that a maximum resolution or accuracy for the distance value is achieved. This can have the advantage that the number of the transmitter and receiver elements required for object detection does not need to be increased by the qualified transmitter and receiver elements.

The one or more qualified transmitter elements are preferably configured to transmit individually a plurality of different intensity levels, and/or to transmit intensity levels which differ from one another, and/or in each case to transmit the same intensity level which in particular is the highest intensity level and corresponds in particular to the intensity level of the non-qualified transmitter elements.

This can have the advantage that intensity levels optimized for different distance ranges are available, that the resolution of the distance value is increased, that the resolution of the distance value is uniformly constant over the entire range of the distance. This can have the advantage that the qualified transmitter elements can also be used for object detection.

The one or more qualified receiver elements are preferably configured to apply in each case individually a plurality of different amplification factors, and/or to apply the same different amplification factors, and/or in each case to apply the same amplification factor, which is in particular the highest one and in particular corresponds to the amplification factor of the non-qualified, i.e. simple, receiver elements.

This can have the advantage that amplification factors optimized for different distance ranges are available, that the resolution of the distance value is increased, that the resolution of the distance value is uniformly constant over the entire range of the distance. This can have the advantage that the qualified receiver elements can also be used for object detection.

The qualified transmitter elements emit radiation which is also used for distance measurement. It is conceivable that non-qualified transmitter elements can also emit radiation of different intensity levels. In addition, in both qualified and non-qualified transmitter elements, an intensity level can be used in a matching manner for emission, which is referred to here as additional intensity level. This is advantageous in particular if a specific intensity level is required for the safety-relevant object detection. The qualified transmitter elements can also be used for simple object detection. To avoid confusion, this additional intensity level can be omitted for the distance measurement. The same applies analogously to the receiver elements.

The light grid preferably has in each case three qualified transmitter and receiver elements and in addition further simple transmitter and receiver elements, which do not contribute to the combinations and/or from which the distance value is not ascertained. The one or more qualified transmitter elements are preferably configured to emit in each case three intensity levels, wherein one intensity level is identical to the intensity level of the non-qualified, i.e. simple, transmitter elements which are provided for object detection, and wherein two intensity levels are lower than the identical one and differ in each case from all other intensity levels. The one or more qualified receiver elements are preferably configured in each case to apply the same two different amplification factors, wherein the higher amplification factor corresponds to the amplification factor of the non-qualified, i.e. simple, receiver elements provided for object detection. The control device is preferably configured to form 12 combinations from the three qualified transmitter and receiver elements, the two overall different, lower intensity values of the qualified transmitter elements and the two different, in each case identical amplification factors of the receiver elements. The control device is preferably configured to use those intensity levels and amplification factors of the qualified transmitter and receiver elements for object detection which correspond to the intensity levels and amplification factors of non-qualified, i.e. simple, transmitter and/or receiver elements.

This can have the advantage that a very fine resolution for the distance value is available.

The light grid preferably comprises a transmission device configured to wirelessly transmit the distance value.

This can have the advantage that the behavior of the cabin door can be transmitted and evaluated without intervention in the control and electronics of the elevator.

Further features are specified in the drawings.

The respectively mentioned advantages can also become reality for feature combinations in connection with which they are not mentioned.

FIG. 1 shows a light grid 20 according to one example comprising the transmitter strip 21 and the receiver strip 22. The transmitter strip 21 has three qualified transmitter elements 31 and further, non-qualified transmitter elements 33, which can emit IR radiation having a specific intensity level. The receiver strip 22 has three qualified receiver elements 32 and further, non-qualified receiver elements 34. The transmitter strip and receiver strip are each arranged perpendicular and mutually parallel and at the same height so as to lie opposite each other. Each qualified transmitter element 31 is assigned, at the same height, a qualified receiver element 32, and these two together form a horizontal transmission beam 30. The light grid 20 additionally has a control device 35.

Figure 2A:
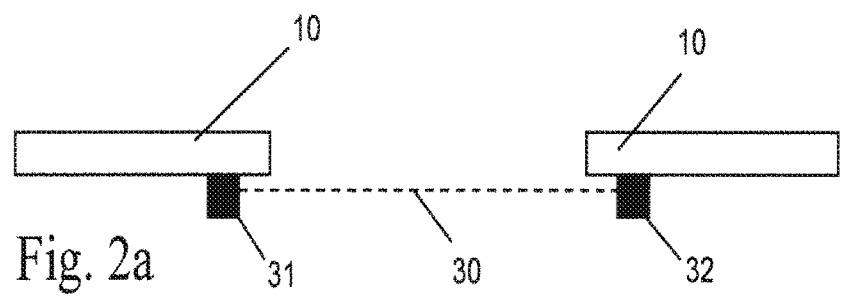
FIG. 2a illustrates an open double sliding door of an elevator cabin with light grid, in one example.
Figure 2B:
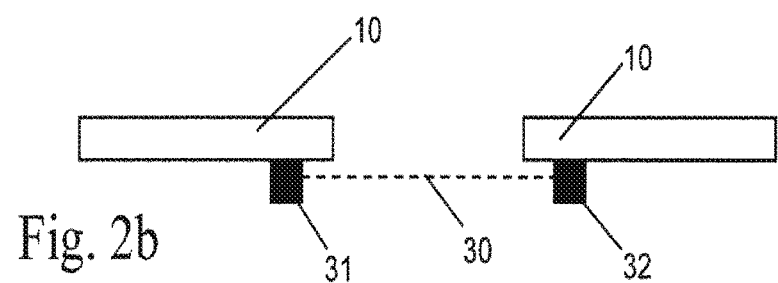
Figure 2C:
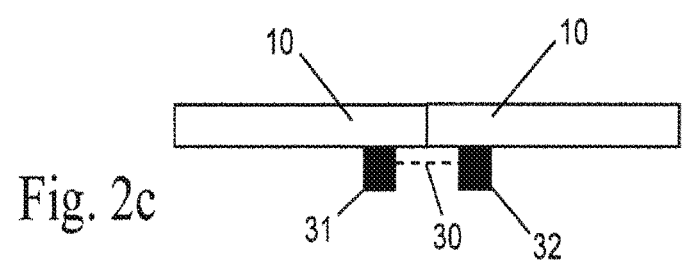

FIGS. 2a to 2c illustrate the light grid 20 of FIG. 1 by way of a double sliding door 10 of an elevator cabin. The transmitter strip 31 is attached to one wing of the double sliding door, and the receiver strip 32 is attached to the opposite wing of the double sliding door. The remaining arrangement is as in FIG. 1. The transmitter strip 31 and receiver strip move along with the double sliding doors and in the process remain parallel and at the same height with respect to one another, with the result that the light beams remain horizontal and assigned to the corresponding qualified transmitter and receiver elements. They reduce the distance between them together with doors when the doors close, and they enlarge the distance between them together with the doors when the doors open. The distance between the transmitter and receiver strips corresponds to the distance between the two wings of the double sliding door except for a constant factor. FIG. 2a shows the open door. FIG. 2b shows the half-closed door. FIG. 2c shows the closed door.

The non-qualified transmitter elements transmit at the intensity level Tx:High and the non-qualified receiver elements have the two amplification factors Rx:High and Rx:Low. Rx:Low is lower than Rx:High. The amplification factors are used at the same time and evaluated separately.

The first qualified transmitter element T1 can emit the intensity levels T1:Low1, T1:Mid1, or T1:High; the second qualified transmitter element T2 can emit the intensity levels T2:Low2, T2:Mid2 or T2:High, and the third qualified transmitter element T3 can emit the intensity levels T3:Low3, T3:Mid3 or T3:High. The intensity levels Tx:High, T1:High, T2:High and T3:High are the same. All other intensity levels are lower. The sequence of the strength of the intensity levels increases: T1:Low1<T2:Low2<T3:Low3<Mid1<Mid2<Mid3<Tx:High. The three qualified receiver elements R1, R2, R3 can each apply the amplification factors Rx:Low or Rx:High.

The control device controls the non-qualified transmitter and receiver elements such that Rx:High is applied for distances above 1 m and Rx:Low is applied for distances below 1 m, the latter so that reflections can be avoided.

The control device controls a sequence of combinations of different intensity levels and amplification factors and evaluates them to obtain a distance value. The highest intensity level Tx:High is not used for this purpose. The combinations are each controlled and evaluated separately. The combinations are:

T1:Low1+R1:Low, T1:Mid1+R1:Low, T1:Low1+R1:High, T1:Mid1+R1:High

T2:Low2+R2:Low, T2:Mid2+R2:Low, T2:Low2+R2:High, T2:Mid1+R2:High

T3:Low3+R3:Low, T3:Mid3+R3:Low, T3:Low3+R3:High, T3:Mid1+R2:High

This adds up to 12 combinations.

Figure 3:
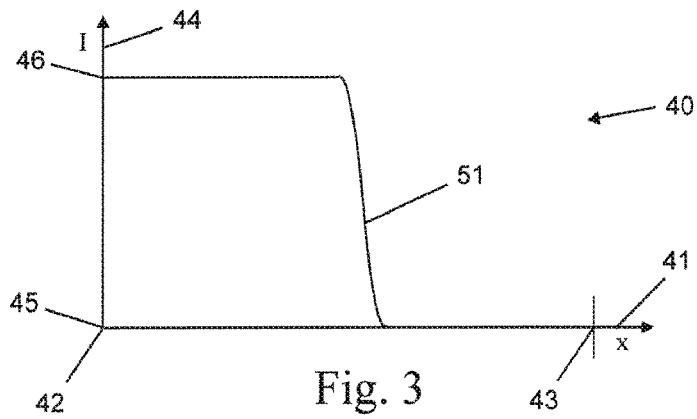
FIG. 3 illustrates a diagram of a measurement curve, in one example.

FIG. 3 is a diagram 40 for the intensity as a function of the distance and shows the measurement profile of a combination. The x-axis 41 shows the distance from transmitter strip to receiver strip. The point 42 shows the minimum distance, and the point 43 shows the maximum evaluable distance. The y-axis 44 shows the intensity value for a specific combination output by a qualified receiver element.

The measurement curve 51 shows by way of example a combination with a medium intensity level of the qualified transmitter element and medium amplification factor of the qualified receiver element. The measurement curve 51 shows a very steep profile at medium distance and is in saturation at shorter distances and without signal at farther distances. The measurement curve thus reflects only a small distance range with good resolution.

Figure 4:
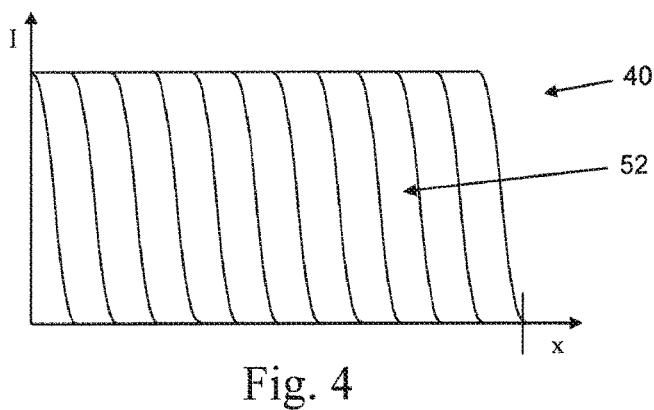
FIG. 4 illustrates a diagram with all measurement curves, in one example.

FIG. 4 is a diagram 40 according to FIG. 3 and shows an overlay of all 12 measurement curves 52 for the 12 combinations.

The different intensity levels and the amplification factor Rx:Low are selected such that a largely uniform sequence of the steep profiles of the measurement curves over the distance is achieved.

Figure 5:
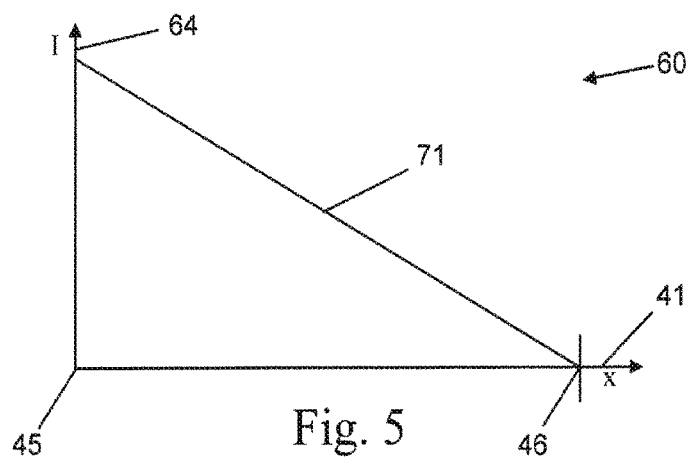
FIG. 5 illustrates a diagram of the distance value, in one example.

FIG. 5 shows a diagram for the sum of the intensity values of all 12 combinations. The x-axis is similar to FIG. 3. The y-axis shows the sum 71 of the intensity values of all 12 combinations from FIG. 4. The sum shows a largely linear profile over the entire distance.

The control device adds up the measured and amplified intensity values of the 12 combinations of one sequence and outputs a distance value as a function of the sum. The control device periodically repeats the sequence and periodically outputs the distance value.

Using the light grid according to one example, the opening movement of the cabin door of an elevator can be measured. Likewise, the distance between movable delimitations of a passage to be monitored by a light curtain can be measured by the light curtain itself.

The light grid according to one example can comprise a transmitter device which wirelessly transmits the distance value, and in particular transmits it to a web cloud.

The data are therefore also available for evaluations or are stored for a relatively long time in order to be able to provide information about process sequences like a blackbox. In particular, this allows monitoring of an elevator door independently of the elevator control.

Although the present invention has been described with reference to preferred embodiments, workers skilled in the art will recognize that changes may be made in form and detail without departing from the spirit and scope of the invention.

LIST OF REFERENCE SIGNS

10 Cabin door
20 Light grid

21 Transmitter strip
22 Receiver strip
30 Light beams
31 Qualified transmitter elements
32 Qualified receiver elements
33 Simple transmitter elements
34 Simple receiver elements
35 Control device
40 Diagram of the intensity as a function of distance
41 x-axis: distance between transmitter and receiver strips
42 Minimum distance
43 Maximum distance
44 y-axis: received and amplified intensity
45 No detection
46 Saturation
51 Measurement curve for an intensity and an amplification factor
52 12 measurement curves from 6 intensity levels and 2 amplification factors
60 Diagram of the sum of the received 12 measurement curves
64 y-axis: sum of the amplified intensities
71 Sum of the 12 measurement curves of 6 intensity levels and 2 amplification factors

The invention claimed is:

1. A light grid for object detection and for determining a distance between a transmitter strip with at least two transmitter elements for emitting radiation and a receiver strip with at least two receiver elements for receiving radiation from the at least two transmitter elements, the light grid comprising a control device, which is configured to output a signal for object detection during an interruption of the receipt from at least one transmitter element of the at least two transmitter elements,
wherein
at least one transmitter element of the at least two transmitter elements
is configured as a qualified transmitter element designed to emit radiation having at least two different intensity levels,
at least one receiver element of the at least two receiver elements
is configured as a qualified receiver element designed to amplify the intensity resulting from the received radiation with at least two different amplification factors and to ascertain therefrom for each qualified transmitter element an intensity value for the received and amplified intensity,
wherein the control device is configured to
control at least two combinations of intensity levels and/or amplification factors of at least one of the qualified transmitter element or the qualified receiver element,
and to ascertain therefrom a sum of the resulting intensity values of at least two of the controlled combinations,
and to output a distance value as a function of the sum,
wherein the control device is configured to
control the combinations successively in a sequence and to periodically repeat the sequence
and to ascertain the sum of the controlled combinations of a sequence
and to ascertain a distance value for each sequence.

2. The light grid as claimed in claim 1, wherein
at least two or all of the transmitter elements are configured as qualified transmitter elements,
at least two or all of the receiver elements are configured as qualified receiver elements.

3. The light grid as claimed in claim 2, wherein
each qualified transmitter element is designed to emit at least two different intensity levels and/or
at least two of the qualified transmitter elements are designed to emit intensity levels which are at least in part different in comparison with one another.

4. The light grid as claimed in claim 2, wherein
each qualified receiver element is designed to amplify the intensity of the received radiation with at least two different amplification factors and/or
at least two of the qualified transmitter elements are designed to amplify the intensity of the received radiation with at least two different amplification factors in comparison with one another.

5. The light grid as claimed in claim 1, wherein
each qualified receiver element is assigned to one specific qualified transmitter element in order to receive and to amplify its radiation.

6. The light grid as claimed in claim 1, wherein
the intensity levels and/or amplification factors are selected from a set of discrete values.

7. The light grid as claimed in claim 1, wherein
the control device is configured to
use predetermined and/or all combinations.

8. The light grid as claimed in claim 1, wherein
the distance value is uniquely assigned to a distance in a measurement range.

9. The light grid as claimed in claim 1, wherein
each combination is assigned a specific and different range of the maximum applicable distance value,
and the ranges cover a contiguous measurement range for the maximum applicable distance value,
wherein the range is a range in which no saturation and/or no signal except for noise is present.

10. The light grid as claimed in claim 1, wherein
a plurality of qualified transmitter elements are configured to
emit intensity levels which are different in a comparison among the qualified transmitter elements
and to emit additionally the same intensity level as an additional intensity level in the comparison among the qualified transmitter elements,
which is higher than the different intensity levels.

11. The light grid is clean in claim 10, wherein the control device is configured to
apply the additional intensity level for object detection
and not to apply the additional intensity level for one of the combinations.

12. The light grid as claimed in claim 2, wherein
the qualified receiver elements are configured to
apply the same different amplification factors in a comparison among the qualified receiver elements.

13. The light grid as claimed in claim 10, wherein
non-qualified transmitter elements are present and are configured to
emit the same intensity level as the additional intensity level or the highest intensity level.

14. The light grid as claimed in claim 13, wherein
non-qualified receiver elements are present and are configured to
apply the same at least two different amplification factors as the qualified receiver elements.

15. The light grid as claimed in claim 14, wherein
the light grid has in each case three qualified transmitter and receiver elements and at least one non-qualified transmitter and receiver element, the qualified transmitter elements are configured to emit in each case three different intensity levels,
  wherein an intensity level
    is identical over all qualified transmitter elements and is higher than the other intensity levels and corresponds to the intensity level of the non-qualified transmitter elements
  and wherein the two further intensity levels
    differ in a comparison among the qualified transmitter elements, the qualified receiver elements are configured to
  apply in each case the same two different amplification factors,
  which correspond to the amplification factors of the non-qualified receiver elements, and the control device is configured to
  form 12 combinations from
    the 3 qualified transmitter elements
    with the respective total of 2 different intensity levels
    and the 2 different amplification factors
  and to apply the highest of the intensity levels in the qualified transmitter elements for object detection.

16. The light grid as claimed in claim 1, wherein
the light grid has a transmission device which is configured to
wirelessly transmit the distance value.

* * * * *